United States Patent
Malshe et al.

(10) Patent No.: US 12,236,374 B1
(45) Date of Patent: Feb. 25, 2025

(54) ENHANCED DYNAMIC LAST-MILE MODELING FOR DELIVERY ASSISTANTS

(71) Applicant: Amazon Technologies, Inc., Seattle, WA (US)

(72) Inventors: Rohit Malshe, Kirkland, WA (US); Liron David Yedidsion, Redmond, WA (US); Jin Ye, Kirkland, WA (US); Dipal Patel Gupta, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 191 days.

(21) Appl. No.: 18/110,265

(22) Filed: Feb. 15, 2023

(51) Int. Cl.
*G06Q 10/047* (2023.01)
*G01C 21/34* (2006.01)
*G06Q 10/083* (2024.01)

(52) U.S. Cl.
CPC ....... *G06Q 10/047* (2013.01); *G01C 21/3438* (2013.01); *G06Q 10/083* (2013.01)

(58) Field of Classification Search
CPC . G06Q 10/047; G06Q 10/083; G01C 21/3438
USPC ........................................................ 701/400
See application file for complete search history.

(56) References Cited

U.S. PATENT DOCUMENTS

| | | | |
|---|---|---|---|
| 11,615,370 B1* | 3/2023 | Li | G06Q 10/08355 705/338 |
| 11,619,512 B1* | 4/2023 | Gupta | G06F 3/14 345/589 |
| 12,112,366 B2* | 10/2024 | Xu | G06Q 30/0641 |
| 2016/0379167 A1* | 12/2016 | Raman | G06Q 10/1097 705/338 |
| 2018/0356823 A1* | 12/2018 | Cooper | G08G 5/025 |
| 2021/0049549 A1* | 2/2021 | Lee | G06F 3/04817 |
| 2022/0044198 A1* | 2/2022 | Meister | G06Q 10/0833 |
| 2022/0180300 A1* | 6/2022 | Alhajahjeh | G06Q 10/083 |
| 2023/0040347 A1* | 2/2023 | Hays | G06F 3/0488 |
| 2024/0174464 A1* | 5/2024 | Moser | B65G 1/137 |

\* cited by examiner

*Primary Examiner* — Tyler D Paige
(74) *Attorney, Agent, or Firm* — Eversheds Sutherland (US) LLP

(57) ABSTRACT

A method of optimizing a delivery route for a delivery vehicle driver and a delivery assistant includes: identifying a delivery route for a delivery vehicle; determining, for each of the packages to be delivered using the delivery route, a first delivery time for a delivery vehicle driver of the delivery vehicle to deliver the respective package without the delivery assistant, a second delivery time for a delivery assistant of the delivery vehicle to deliver the respective package without the delivery vehicle driver, and a third delivery time for both the delivery assistant and the delivery vehicle driver to deliver the respective package; determining minimum times needed by the delivery vehicle driver and the delivery assistant to deliver the packages using the delivery route; and determining that a minimum of the estimated total delivery times corresponds to a first subset and a second subset of the packages.

20 Claims, 6 Drawing Sheets

ENHANCED DYNAMIC LAST-MILE MODELING FOR DELIVERY ASSISTANTS

BACKGROUND

Some package delivery methods use a delivery assistant in addition to a delivery vehicle driver so that the delivery assistant may help the delivery driver deliver packages from a delivery vehicle during a delivery route.

DETAILED DESCRIPTION OF THE DRAWINGS

Overview

Figure 1:
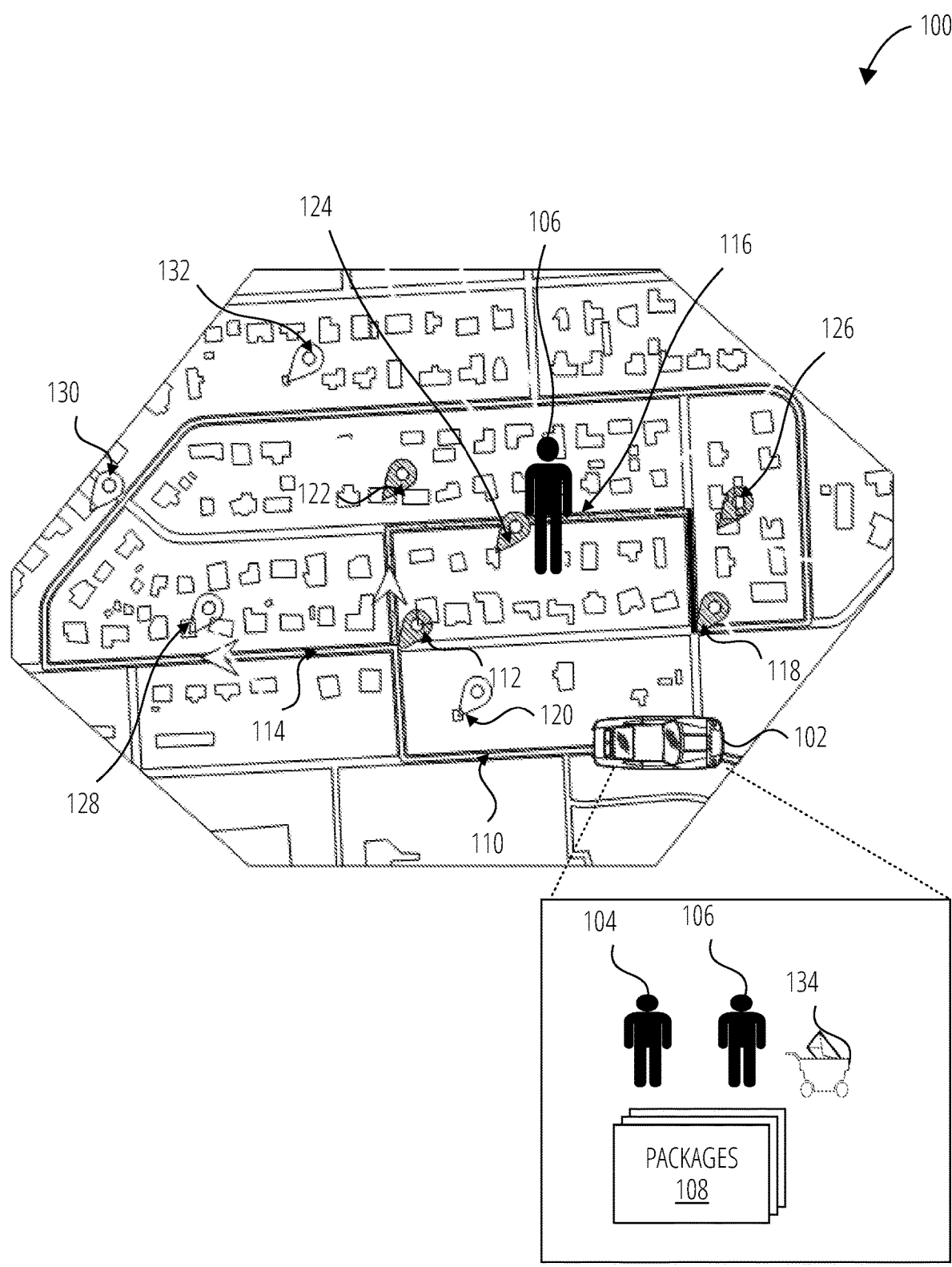
FIG. 1 illustrates an aspect of the subject matter in accordance with one embodiment.

Example embodiments described herein provide certain systems, methods, and devices for enhanced dynamic last-mile modeling with delivery assistants.

Package delivery services may use a combination of delivery vehicles, drivers of delivery vehicles, and delivery assistants. A delivery vehicle driver and a delivery assistant may divide and distribute tasks such as searching for the next package to be delivered while another package is being delivered from the delivery vehicle to a delivery location.

To increase the number of deliveries made on a delivery route, the delivery assistant may be dispatched on a delivery route with a delivery vehicle and a delivery assistant. During the delivery route, the delivery assistant may depart from the delivery vehicle with one or more packages to deliver separately (e.g., using a walking route) from the delivery driver and vehicle, which may continue on the delivery route so that the delivery driver may separately make deliveries from the delivery vehicle. The delivery driver and vehicle later may rendezvous with the delivery assistant.

The concurrent use of a delivery driver and delivery assistant on a delivery route may increase the number of deliveries that may be made during a time-limited delivery route (e.g., a delivery shift for the driver and assistant), may reduce the number of delivery vehicles needed for a delivery vehicle fleet, may allow for meeting high delivery demand/volume, and may allow for deliveries to be made faster.

Where a delivery assistant is to separate from the delivery vehicle, what routes the delivery vehicle and delivery assistant should use, and when and where the delivery vehicle and delivery assistant should rendezvous are challenging decisions that may impact delivery output, timing, vehicle need, and driver and assistant need. Optimization of these decisions is therefore desirable.

In one or more embodiments, a delivery optimization model may generate a delivery route of a delivery vehicle from a delivery station to multiple delivery locations. The delivery route may include one or more locations at which the delivery assistant is to depart from the delivery vehicle to deliver one or more packages to one or more delivery locations while the delivery driver continues to drive the delivery vehicle to separate delivery locations to make additional deliveries separately from the delivery assistant. The delivery optimization model may optimize the locations at which the delivery assistant is to depart from the delivery vehicle for separate deliveries, the locations at which the delivery assistant is to rendezvous with the delivery vehicle after making separate deliveries, the driving route of the delivery vehicle (including when separated from the delivery assistant), the walking route of the delivery assistant (e.g., from the location at which the delivery assistant departs the delivery vehicle, to one or more delivery locations separate from the delivery vehicle's driving route, and to a rendezvous location), and the packages to be delivered by the delivery driver and by the delivery assistant (e.g., which packages the delivery assistant should take from the delivery vehicle to be delivered separately while the delivery driver continues deliveries from the delivery vehicle). In this manner, the delivery optimization model may allow a delivery assistant to act as both a helper (e.g., helping a delivery driver while both are in a delivery vehicle) and as a separate walker (e.g., performing separate deliveries by departing from the delivery vehicle while the delivery vehicle continues to drive to separate delivery locations).

In one or more embodiments, the delivery optimization model may segment a delivery route into portions in which a delivery assistant departs the delivery vehicle (e.g., with a handcart) with packages and delivers the packages as a walker while the delivery driver separately continues to drive the delivery vehicle to other delivery locations. For example, the delivery optimization model may identify areas that are not as dense and where transit times are longer and parking is easier, as such areas may be more suitable for driving than for walking. The delivery optimization model may allow for the delivery route to have times when the delivery assistant operates as a helper in the delivery vehicle and times when the delivery assistant operates separately as a walker.

In one or more embodiments, the delivery optimization model may optimize the lowest on-zone time by looking at a delivery route and breaking it into segments (e.g., sets of consecutive packages along a trace). A segment may represent a meet-up in which the delivery assistant and the delivery vehicle driver deliver a next set of packages. The delivery optimization model considers for a segment whether to split the packages and how (e.g., between the delivery vehicle driver and the delivery assistant), or to deliver packages together (e.g., from the delivery vehicle together). For an example of splitting the packages, for packages 5-20 on a delivery route, the delivery optimization model may assess partition options (e.g., package 5 vs. 6-20, packages 5 and 6 vs. 7-20, packages 5-7 vs. 8-20, . . . , packages 5-19 vs. 20) and assigns the lower-indexed packages to either the delivery vehicle driver or the delivery assistant. For a partition and assignment, the cost may be the maximum time for the delivery vehicle driver or delivery assistant to complete their assigned package deliveries. If either delivery vehicle driver or the delivery assistant completes their assignment first, they will have to wait until the other completes their assignment before moving on to their next delivery block. Any option may incur a meet-up penalty to account for time wasted coordinating a rendezvous location. The delivery optimization model may compare any package splitting option against an option in which helper and delivery vehicle driver work together to deliver all the packages in the partition. In this case the service time is reduced and no meetup penalty is added. The delivery optimization model optimizes for the partitions and assignments that result in the least total time on-zone. When the delivery optimization model selects to split the delivery vehicle driver and helper, the optimal partitions are those that minimize the maximal delivery times between the delivery vehicle driver and helper.

In one or more embodiments, given the optimized on-zone time, the delivery optimization model may calculate a time-constrained boost factor for a delivery route using $$\frac{\text{(originally planned on-zone minutes)}}{\text{(optimized on-zone minutes}-1)}.$$

With respect to a vehicle size constraint, the delivery optimization model may calculate a cube-constrained boost factor for a delivery route using $$\frac{\text{(vehicle cube cap)}}{\text{(average package size}-1)}.$$

The delivery route's boost factor may be the smallest of the two calculations.

In one or more embodiments, the delivery optimization model may use the following parameters and variables: P may refer to a set of all packages on a delivery route; $t_p^h$ may refer to a delivery time of package p by a delivery assistant; $t_p^d$ may refer to the delivery time of package p by a delivery vehicle driver; $t_p^{dh}$ may refer to a delivery time of package p by a delivery assistant and delivery vehicle driver traveling together; may refer to a delivery time of packages q through p by a delivery assistant; $\tau_{qp}^d$ may refer to a delivery time of packages q through p by a delivery vehicle driver; $\tau_{qp}^{dh}$ may refer to a delivery time of packages q through p by the delivery vehicle driver and the delivery assistant working together (e.g., in the delivery vehicle); $c_m$ may refer to a meeting time penalty; $\mu_{qp}$ may refer to a marginal contribution to the time for delivering packages q, . . . , p in the most efficient way. The delivery optimization model may divide packages between the delivery vehicle driver and the delivery assistant according to Equation (1) for the cost element:

$$\mu_{qp} = \min\left\{\min_{q \leq r < p}\left\{\min\{\max\{\tau_{qr}^h, \tau_{r+1,p}^d\} + c_m, \max\{\tau_{qr}^d, \tau_{r+1,p}^h\} + c_m\}\right\}, \tau_{qp}^{dh}\right\}.$$

The total cost of delivering all packages 1 through p on a delivery route may be represented by F(p) in Equation (2):

$$F(p) = \min_{q \in [1,\ldots,p-1]}\{F(q-1) + \mu_{qp}\}.$$

The stopping criterion may be represented by F(0)=0.

In one or more embodiments, the following constraints may be enforced on the delivery optimization model: (1) The total package size within a helper block may correspond to the cubic feet of a walker cart; (2) the helper walking distance within a helper block may be limited (e.g., one mile or less); (3) the helper working time (e.g., service time plus walking time) within a helper block may be limited (e.g., two hours or fewer); (4) helper walking speed may be estimated (e.g., three miles per hour) and helpers follow delivery route directions intended for a delivery vehicle; (5) meetup/rendezvous time may consume a certain amount of time (e.g., twenty minutes); and (6) the delivery optimization model may be run on aggregates of packages such that packages may be on a same sort zone, address identifier, place identifier, or stop identifier, to prevent coincidence between the delivery vehicle driver and the delivery assistant. For example, the delivery optimization model may identify consecutive package blocks adding up to the total package size allowed by the walker cart. The delivery optimization model may build a table with a first and last package identifier of a candidate block of packages that may fit on the size allowed by the walker cart, and may find all possible non-overlapping block combinations. The packages not covered by the candidate blocks may be assigned for delivery to the delivery vehicle driver. A new on-zone time may be set to a maximum time between the total helper on-zone time and the driver on-zone time, plus the set rendezvous time penalty per helper block (e.g., twenty minutes). For any delivery route, the delivery optimization model may identify the optimal block combination that results in the least on-zone time minutes.

An example of a set of seven packages sequenced along a delivery route is shown in Table 1:

| Package Number | $t_p^d$ | $t_p^h$ | $t_p^{dh}$ |
|---|---|---|---|
| 1 | 5 | 10 | 4 |
| 2 | 12 | 15 | 9 |
| 3 | 15 | 15 | 11 |
| 4 | 22 | 40 | 17 |
| 5 | 14 | 14 | 11 |
| 6 | 6 | 8 | 5 |
| 7 | 9 | 15 | 7 |

Using the example of Table 1, the delivery optimization model may assume that each split delivery vehicle driver and helper uses a meetup time $c_m$ of six minutes. The delivery optimization model may calculate the values of $\mu_{qp}$ for combinations of q and p. For a subset of packages 2-6, one option would be for the delivery vehicle driver and delivery assistant to work together in the delivery vehicle, in which case the delivery time would be $$t_{2,6}^{dh} = \sum_2^5 t_p^{dh} = 53.$$

Another option would be to split at r=2. In the latter case, all of the packages may be assigned to the delivery vehicle driver:

$$\max\{t_{2,6}^d, 0\} + c_m = \max\left\{\sum_2^5 t_p^d, 0\right\} + 6 = 75,$$

or to the delivery assistant:

$$\max\{0, t_{2,6}^h\} + c_m = \max\left\{0, \sum_{2}^{5} t_p^h\right\} + 6 = 98.$$

Splitting at r=3 results in either $\max\{t_{3,6}^d, t_{2,2}^h\}+c_m=63$ or $\max\{t_{2,2}^d, t_{3,6}^h\}+c_m=95$. Similarly, the delivery optimization model may examine possible splits for r=4, 5, 6 and select the option that yields the shortest time end to end from package 2 to package 6, including meet up time. In the example case, the optimal solution may be achieved in a split in which the delivery assistant delivers packages 2 and 3, and the delivery vehicle driver delivers packages 4-6 (e.g., concurrently): $\max\{t_{4,6}^d, t_{2,3}^h\}+c_m=\max\{42, 37\}+6=48$.

The delivery optimization model may trace back which option provides the optimal value, the delivery optimization model may use a 3-tuple notation of $(\alpha, \beta, \gamma)$ where $\alpha$ represents the value, $\beta \in \{0, 1, 2\}$ where 0 represents a split in which the delivery assistant delivers the lower-indexed packages, 1 represents a split in which the delivery vehicle driver delivers the lower-indexed packages, 2 is when the delivery vehicle driver and the delivery assistant deliver packages together, and $\gamma$ represents where a split occurs (e.g., as long as $\beta$ is not 2). The optimal values for $\mu_{qp}$ are represented by Table 2:

|  | $\mu_{q,1}$ | $\mu_{q,2}$ | $\mu_{q,3}$ | $\mu_{q,4}$ | $\mu_{q,5}$ | $\mu_{q,6}$ | $\mu_{q,7}$ |
|---|---|---|---|---|---|---|---|
| $\mu_{1,p}$ | (4, 2, -) | (13, 2, -) | (23, 1, 2) | (43, 0, 3) | (46, 0, 3) | (48, 0, 3) | (57, 0, 3) |
| $\mu_{2,p}$ |  | (9, 2, -) | (20, 2, -) | (36, 0, 3) | (42, 0, 3) | (48, 0, 3) | (55, 1, 4) |
| $\mu_{3,p}$ |  |  | (11, 2, -) | (28, 2, -) | (39, 2, -( | (43, 1, 4) | (43, 1, 4) |
| $\mu_{4,p}$ |  |  |  | (17, 2, -) | (28, 1, 4) | (28, 1, 4) | (40, 2, -) |
| $\mu_{5,p}$ |  |  |  |  | (11, 2, -) | (16, 2, -) | (20, 0, 5) |
| $\mu_{6,p}$ |  |  |  |  |  | (5, 2, -1) | (12, 2, -) |
| $\mu_{7,p}$ |  |  |  |  |  |  | (7, 2, -) |

The delivery optimization model may run based on the values of Table 2:

$$F(0) = 0;$$

$$F(1) = F(0) + \mu_{1,1} = 0 + 4 = 4;$$

$$F(2) = \min\begin{bmatrix} F(0) + \mu_{1,2} = 0 + 13 = 13 \\ F(1) + \mu_{2,2} = 4 + 20 = 24 \end{bmatrix} = 13;$$

$$F(3) = \min\begin{bmatrix} F(0) + \mu_{1,3} = 0 + 23 = 23 \\ F(1) + \mu_{2,3} = 4 + 20 = 24 \\ F(2) + \mu_{3,3} = 13 + 11 = 24 \end{bmatrix} 23;$$

$$F(4) = \min\begin{bmatrix} F(0) + \mu_{1,4} = 0 + 43 = 43 \\ F(1) + \mu_{2,4} = 4 + 36 = 40 \\ F(3) + \mu_{3,4} = 13 + 28 = 41 \\ F(4) + \mu_{4,4} = 23 + 17 = 40 \end{bmatrix} = 40;$$

$$F(5) = \min\begin{bmatrix} F(0) = \mu_{1,5} = 0 + 46 = 46 \\ F(1) + \mu_{2,5} = 4 + 42 = 46 \\ F(2) + \mu_{3,5} = 13 + 39 = 52 \\ F(3) + \mu_{4,5} = 23 + 28 = 51 \\ F(4) + \mu_{5,5} = 40 + 11 = 51 \end{bmatrix} = 46;$$

$$F(6) = \min\begin{bmatrix} F(0) + \mu_{1,6} = 0 + 48 = 48 \\ F(1) + \mu_{2,6} = 4 + 48 = 52 \\ F(2) + \mu_{3,6} = 13 + 43 = 56 \\ F(3) + \mu_{4,6} = 23 + 28 = 51 \\ F(4) + \mu_{5,6} = 40 + 16 = 56 \\ F(5) + \mu_{6,6} = 46 + 5 = 51 \end{bmatrix} = 48;$$

$$F(7) = \min\begin{bmatrix} F(0) + \mu_{1,7} = 0 + 57 = 57 \\ F(1) + \mu_{2,7} = 4 + 48 = 52 \\ F(2) + \mu_{3,7} = 13 + 43 = 56 \\ F(3) + \mu_{4,7} = 23 + 40 = 63 \\ F(4) + \mu_{5,7} = 40 + 20 = 60 \\ F(5) + \mu_{6,7} = 46 + 12 = 58 \\ F(6) + \mu_{7,7} = 48 + 7 = 55 \end{bmatrix} = 55.$$

To trace the optimal solution, the delivery optimization model may start from F(7) from the example scenario above. The solution that resulted in the minimum value of 55 is $F(6)+\mu_{7,7}$, and $\mu_{7,7}$ means that package 7 is handled separately (e.g., by the delivery vehicle driver or the delivery assistant). Table 2 above shows that package 7 is associated with tuple (7, 2,-), which means that the delivery vehicle driver and the delivery assistant deliver the package together. Therefore, from F(7), the delivery optimization model examines F(6), whose minimum solution was $F(0)+\mu_{1,6}$. Table 2 shows that the associated tuple is (48, 0, 3), meaning that packages 1-6 may be split into groups of packages 1-3 to be delivered by the delivery vehicle driver and packages 4-6 to be delivered by the delivery vehicle driver. The delivery optimization model may trace back to F(0), the stopping criterion, and the solution may be that the delivery vehicle driver and the delivery assistant split the packages 1-3 and 4-6, the delivery assistant uses 40 minutes to deliver packages 1-3 and the delivery vehicle driver uses 42 minutes to deliver packages 4-6, the rendezvous uses six minutes, resulting in max{40, 42}+6=48 minutes. The delivery vehicle driver and the delivery assistant may continue making deliveries together (e.g., for package 7) after the rendezvous.

In one or more embodiments, when the delivery vehicle driver and delivery assistant travel together in the delivery vehicle to perform one or more deliveries, the delivery vehicle driver and delivery assistant both may be assigned a same delivery (e.g., performing some combination of identifying packages to be delivered to a delivery location, unloading the packages, and physically bringing the packages from the delivery vehicle to the delivery location). Alternatively, one of the delivery vehicle driver and delivery assistant may not perform operations on a particular delivery even though they may be traveling together. For example, the delivery vehicle driver or delivery assistant may individually make a delivery from the delivery vehicle even when the delivery vehicle driver and delivery assistant are both traveling together. The delivery vehicle driver and delivery assistant may make separate deliveries from the delivery vehicle even when traveling together.

In one or more embodiments, the optimization model may be used to determine which delivery routes are to have a delivery assistant and which delivery routes are to have only a delivery vehicle driver. For example, if there are ten concurrent delivery routes and eight delivery assistants, not all ten delivery routes may have a delivery assistant. The delivery routes assigned a delivery assistant may be the delivery routes with the highest boost factor. When the number of delivery drivers exceeds the number of delivery routes, a delivery driver may be assigned as a delivery assistant. In addition, delivery vehicle drivers and delivery assistants may receive targeted (personalized) training. For example, a delivery assistant may be trained to become a delivery driver. Training may include consideration of the person's past delivery experience (e.g., whether they have delivered packages, in certain areas, have been a driver, etc.). A delivery vehicle driver and a delivery assistant may swap roles for part of a delivery route to train a delivery assistant to become a delivery driver, and the delivery assistant may receive feedback as a delivery vehicle driver. Training may result in more delivery vehicle drivers available, who can be delivery assistants when needed, resulting in fewer delivery vehicles on the road.

In one or more embodiments, both a delivery vehicle driver and a delivery assistant may receive customized user interfaces on their devices to show which packages and delivery locations they are assigned. In this manner, the user interface presented to a delivery vehicle driver may be different than the user interface presented to the delivery assistant on the same delivery route.

In one or more embodiments, the delivery optimization model may use machine learning to learn and adjust criteria for delivery allocations and package partitions. For example, when a delivery time or rendezvous time takes longer or shorter than estimated, those values may be updated for subsequent use in the optimization calculations. Training and experience of a delivery assistant also may be used to update the criteria. The delivery optimization model also may account for whether a delivery vehicle driver or delivery assistant has previously delivered to a delivery location. For example, when a person has successfully delivered to a delivery location in the past, the assignment of a delivery to that delivery location may be made to the same person.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example enhanced delivery route 100 in accordance with one or more embodiments of the present disclosure.

Referring to FIG. 1, the delivery route 100 may include a delivery vehicle 102 with a delivery vehicle driver 104 and a delivery assistant 106 to deliver packages 108 to delivery locations along the delivery route 100. During a first delivery route portion 110 of the delivery route 100, the delivery vehicle driver 104 and the delivery assistant 106 may operate together from the delivery vehicle 102 to deliver the packages 108. At a separation location 112, the delivery assistant 106 may depart the delivery vehicle 102 and walk or otherwise travel separately from the delivery vehicle 102 to deliver packages. After the separation location 112, the delivery vehicle 102 may drive (e.g., using the delivery vehicle driver 104) along a second delivery route portion 114 to deliver packages while the delivery assistant 106 may walk or otherwise travel separately along a third delivery route portion 116 for deliveries separate from the delivery vehicle 102 and the delivery vehicle driver 104. At a rendezvous location 118, the delivery assistant 106 may meet up with the delivery vehicle 102 and the delivery vehicle driver 104 to continue the delivery route 100. In this manner, the delivery vehicle driver 104 and delivery assistant 106 may operate together along the first delivery route portion 110 to deliver packages to delivery locations (e.g., delivery location 120), then the delivery assistant 106 and delivery vehicle driver 104 may separate so that the delivery assistant 106 may deliver packages along the third delivery route portion 116 (e.g., to delivery location 122, delivery location 124, and delivery location 126) while the delivery vehicle 102 and the delivery vehicle driver 104 deliver packages along the second delivery route portion 114 (e.g., to delivery location 128, delivery location 130, and delivery location 132). The delivery assistant 106 when delivering the packages 108 may use a cart 136 (or bag or other means of transporting the packages 108), whose size (e.g., volume) may be used to determine which of the packages 108 that the delivery assistant 106 is to deliver.

In one or more embodiments, a delivery optimization model may generate the delivery route 100 of the delivery vehicle 102. The delivery route 100 may include one or more locations (e.g., the separation location 112) at which the delivery assistant 106 is to depart from the delivery vehicle 102 to deliver one or more of the packages 108 to one or more delivery locations while the delivery vehicle driver 104 continues to drive the delivery vehicle 102 to separate delivery locations to make additional deliveries separately from the delivery assistant 106. The delivery optimization model may optimize the locations at which the delivery assistant 106 is to depart from the delivery vehicle 102 for separate deliveries, the locations at which the delivery assistant is to rendezvous with the delivery vehicle 102 after making separate deliveries (e.g., the rendezvous location 118), the driving route of the delivery vehicle 102 (e.g., the second delivery route portion 114), the walking route of the delivery assistant 106 (e.g., the third delivery route portion 116), and the packages to be delivered by the delivery vehicle driver 104 and by the delivery assistant 106 (e.g., which packages the delivery assistant 106 should take from the delivery vehicle 102 to be delivered using the third delivery route portion 116). In this manner, the delivery optimization model may allow a delivery assistant 106 to act as both a helper (e.g., during the first delivery route portion 110) and as a separate walker (e.g., during the third delivery route portion 116).

In one or more embodiments, the delivery optimization model may segment the delivery route 100 into portions in which a delivery assistant 106 departs the delivery vehicle 102 (e.g., with a handcart) with packages and delivers the packages as a walker while the delivery vehicle driver 104 separately continues to drive the delivery vehicle 102 to other delivery locations. For example, the delivery optimization model may identify areas that are not as dense and where transit times are longer and parking is easier, as such areas may be more suitable for driving than for walking. The delivery optimization model may allow for the delivery route 100 to have times when the delivery assistant 106 operates as a helper in the delivery vehicle 102 and times when the delivery assistant 106 operates separately as a walker.

In one or more embodiments, the delivery optimization model may optimize the lowest on-zone time by looking at the delivery route 100 and breaking it into segments (e.g., sets of consecutive packages along a trace). A segment (portion) may represent a meet-up in which the delivery assistant 106 and the delivery vehicle driver 104 deliver a next set of packages. The delivery optimization model considers for a segment whether to split the packages and how (e.g., between the delivery vehicle driver 104 and the delivery assistant 106), or to deliver packages together (e.g., from the delivery vehicle 102 together). For an example of splitting the packages, for packages 5-20 of the packages 108, the delivery optimization model may assess partition options (e.g., package 5 vs. 6-20, packages 5 and 6 vs. 7-20, packages 5-7 vs. 8-20, . . . , packages 5-19 vs. 20) and assigns the lower-indexed packages to either the delivery vehicle driver 104 or the delivery assistant 106. For a partition and assignment, the cost may be the maximum time for the delivery vehicle driver 104 or delivery assistant 106 to complete their assigned package deliveries. If either delivery vehicle driver 104 or the delivery assistant 106 completes their assignment first, they will have to wait until the other completes their assignment before moving on to their next delivery block. Any option may incur a meet-up penalty to account for time wasted coordinating the rendezvous location 118. The delivery optimization model may compare any package splitting option against an option in which the delivery assistant 106 and the delivery vehicle driver 104 work together to deliver all the packages 108 in the partition. In this case the service time is reduced and no meetup penalty is added. The delivery optimization model optimizes for the partitions and assignments that result in the least total time on-zone. When the delivery optimization model selects to split the delivery vehicle driver 104 and delivery assistant 106, the optimal partitions are those that minimize the maximal delivery times between the delivery vehicle driver 104 and delivery assistant 106.

In one or more embodiments, the delivery optimization model may divide packages between the delivery vehicle driver and the delivery assistant according to Equation (1) for the cost element.

In one or more embodiments, the following constraints may be enforced on the delivery optimization model: (1) The total package size within the third delivery route portion 116 may correspond to the cubic feet of a walker cart/bag (e.g., the cart 136) used by the delivery assistant 106 to transport packages; (2) the delivery assistant 106 walking distance within the third delivery route portion 116 may be limited (e.g., one mile or less); (3) the delivery assistant 106 working time (e.g., service time plus walking time) within the third delivery route portion 116 may be limited (e.g., two hours or less); (4) delivery assistant 106 walking speed may be estimated (e.g., three miles per hour) and the delivery assistant 106 is expected to follow delivery route directions; (5) meetup/rendezvous time may consume a certain amount of time (e.g., twenty minutes); and (6) the delivery optimization model may be run on aggregates of the packages 108 such that packages may be on a same sort zone, address identifier, place identifier, or stop identifier, to prevent coincidence between the delivery vehicle driver 104 and the delivery assistant 106. For example, the delivery optimization model may identify consecutive package blocks adding up to the total package size allowed by the walker cart. The delivery optimization model may build a table with a first and last package identifier of a candidate block of the packages 108 that may fit on the size allowed by the walker cart, and may find all possible non-overlapping block combinations. The packages 108 not covered by the candidate blocks may be assigned for delivery to the delivery vehicle driver 104. A new on-zone time may be set to a maximum time between the total helper on-zone time and the driver on-zone time, plus the set rendezvous time penalty per helper block (e.g., twenty minutes). For any delivery route, the delivery optimization model may identify the optimal block combination that results in the least on-zone time minutes.

In one or more embodiments, the delivery optimization model may assume that each split delivery vehicle driver 104 and delivery assistant 106 uses a meetup time $c_m$ of six minutes. The delivery optimization model may calculate the values of $\mu_{qp}$ for combinations of q and p. The delivery optimization model may examine any possible splits and select the option that yields the shortest time end to end for any number of the packages 108, including meet up time.

The delivery optimization model may trace back which option provides the optimal value, the delivery optimization model may use a 3-tuple notation of ($\alpha$, $\beta$, $\gamma$) where $\alpha$ represents the value, $\beta \in \{0, 1, 2\}$ where 0 represents a split in which the delivery assistant delivers the lower-indexed packages, 1 represents a split in which the delivery vehicle driver delivers the lower-indexed packages, 2 is when the delivery vehicle driver and the delivery assistant deliver packages together, and $\gamma$ represents where a split occurs (e.g., as long as $\beta$ is not 2).

To trace the optimal solution, the delivery optimization model may trace back to F(0), the stopping criterion, and the solution may be that the delivery vehicle driver 104 and the delivery assistant 106 split the packages 108. The delivery vehicle driver 104 and the delivery assistant 106 may continue making deliveries together after the rendezvous location 118. In this manner, the delivery optimization model may minimize the delivery time for the delivery route 100 by splitting the delivery route 100 into different delivery route portions in which the delivery vehicle driver 104 and the delivery assistant 106 operate from the delivery vehicle 102 together, in which the delivery assistant 106 separately delivers packages, when and where the separation location 112 occurs, and when and where the rendezvous location 118 occurs. Multiple separation locations and rendezvous locations may be implemented for the delivery route 100.

Figure 2:
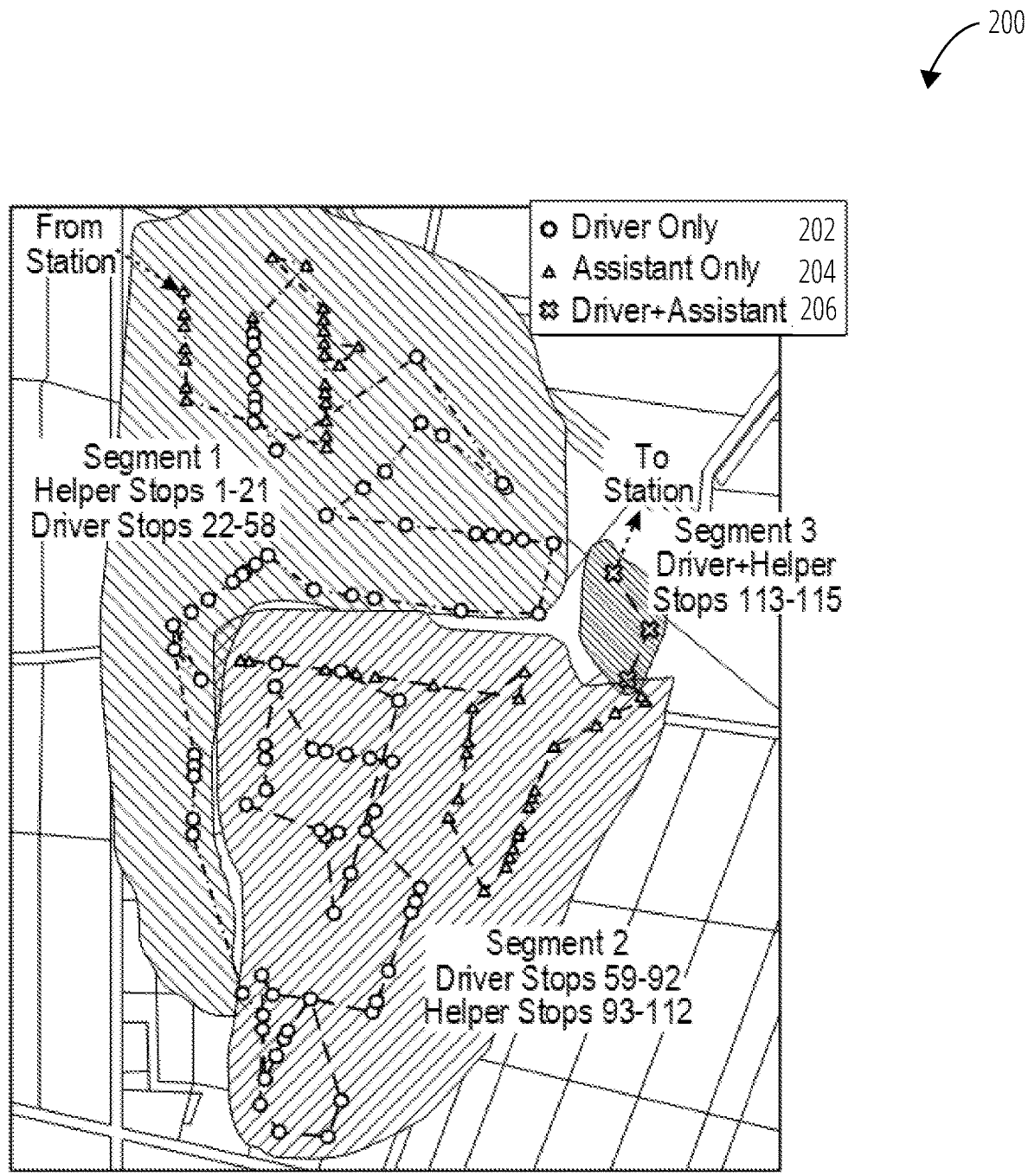
FIG. 2 illustrates an example enhanced delivery route in accordance with one or more embodiments of the present disclosure.

FIG. 2 illustrates an example enhanced delivery route 200 in accordance with one or more embodiments of the present disclosure.

Referring to FIG. 2, the delivery route 200 shows driver-only delivery locations 202 (e.g., portions of the delivery route 200 in which only the delivery vehicle driver 104 and the delivery vehicle 102 of FIG. 1 are to deliver packages), assistant-only locations 204 (e.g., portions of the delivery route 200 in which only the delivery assistant 106 of FIG. 1 is to deliver packages), and driver plus assistant portions 206 (e.g., portions of the delivery route 200 in which both the delivery vehicle driver 104 and the delivery assistant 106 are to deliver packages from the delivery vehicle driver delivery vehicle 102 together). As shown in FIG. 2, the helper (delivery assistant 106) is to deliver separately to stops 1-21 while the delivery vehicle driver 104 is to deliver separately to stops 22-58 in a first segment (segment 1). In a second segment (segment 2), the delivery vehicle driver 104 is to deliver separately to stops 59-92 while the helper (delivery assistant 106) is to deliver separately to stops 93-112. In a third segment (segment 3), the delivery assistant 106 and the delivery vehicle driver 104 are to deliver packages together at stops 113-115.

Figure 3:
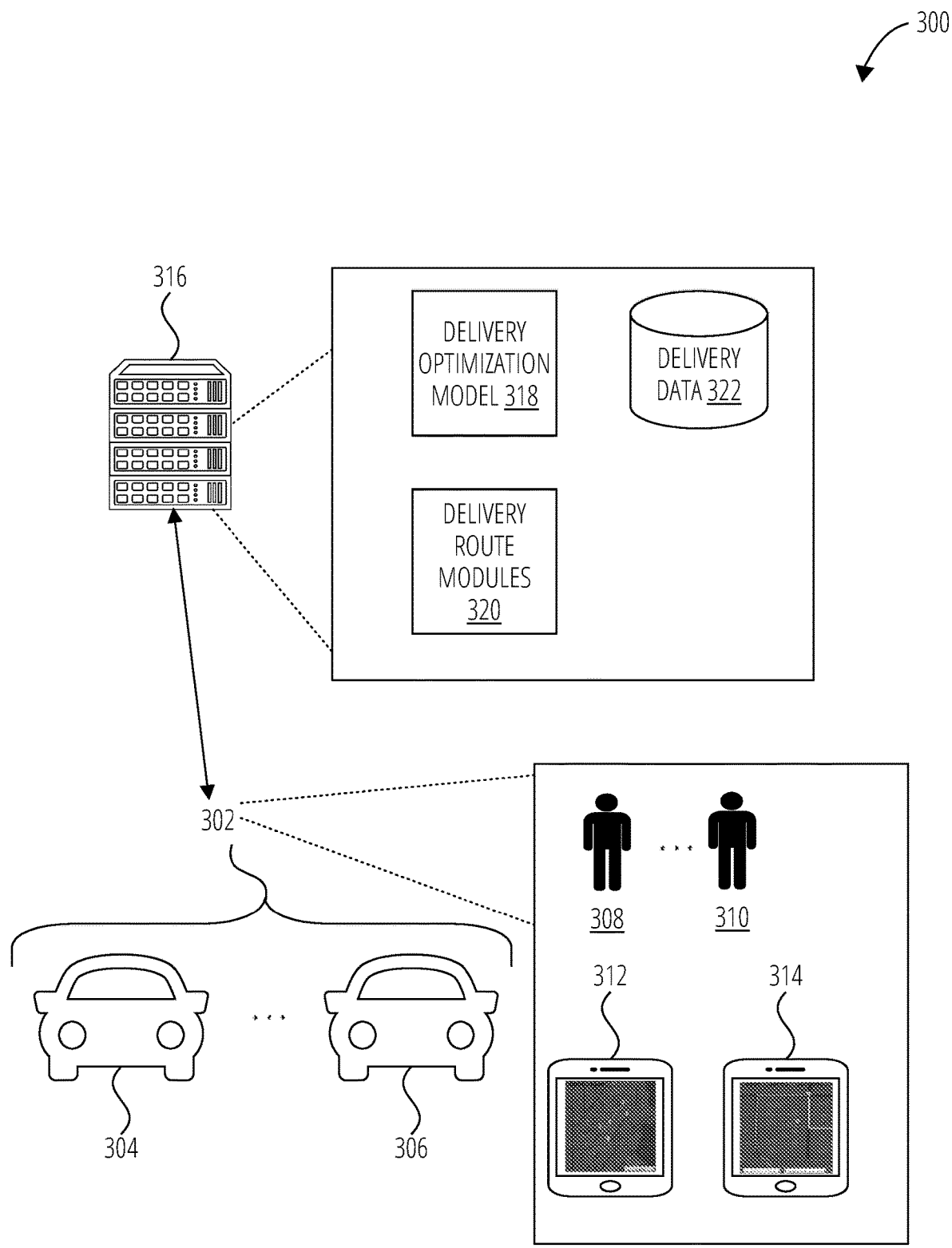
FIG. 3 illustrates an example delivery system in accordance with one or more embodiments of the present disclosure.

FIG. 3 illustrates an example delivery system 300 in accordance with one or more embodiments of the present disclosure.

Figure 4:
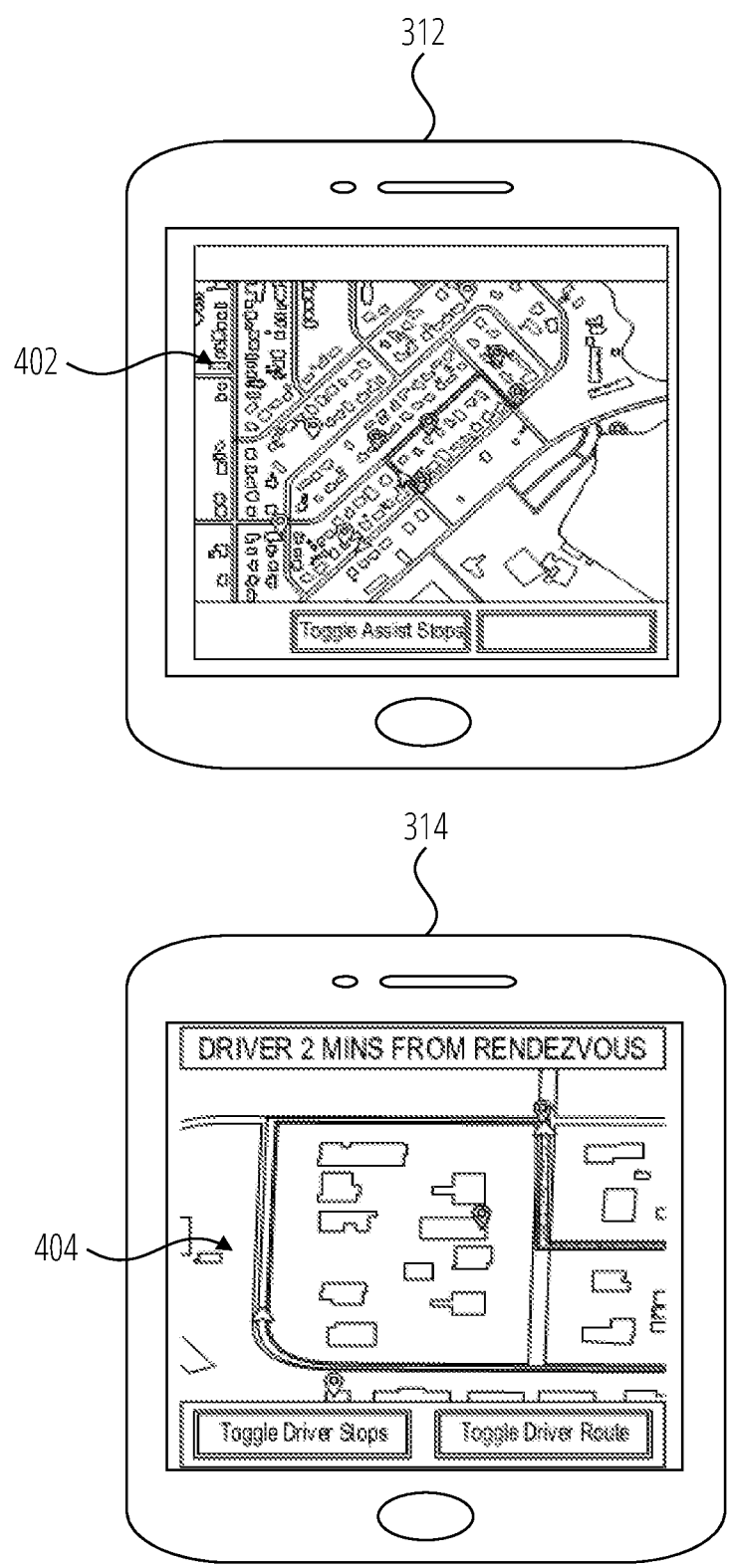
FIG. 4 illustrates example user interfaces for a delivery vehicle driver and for a delivery assistant in accordance with one or more embodiments of the present disclosure.

Referring to FIG. 3, delivery vehicles 302 (e.g., having delivery vehicle drivers 308 and delivery assistants 310, and having devices 312 and devices 314 for presentation (e.g., the devices 312 may be for the delivery vehicle drivers 308 and the devices 314 may be for the delivery assistants 310 so that the delivery vehicle drivers 308 are presented with different information than the delivery assistants 310 as shown further in FIG. 4). of instructions and/or map data identifying delivery routes, delivery locations, and who is to deliver which packages to particular delivery locations, rendezvous locations, separation locations, and the like) may communicate with a remote system 316 (e.g., a remote cloud-based network) to receive delivery instructions. The remote system 316 may include a delivery optimization model 318 to determine who is to deliver which packages to particular delivery locations, rendezvous locations, and separation locations. The remote system 316 may include delivery route modules 320 to generate delivery routes and instructions for the delivery vehicle driver 308 and the delivery assistant 310 based on the determinations of the delivery optimization model 318. The delivery optimization model 318 and the delivery route modules 320 may rely on delivery data 322, such as delivery locations, delivery routes, traffic data, walking and driving data, package data (e.g., packages to be delivered, package sizes, etc.), delivery vehicle data, and the like) for their analyses.

In one or more embodiments, the delivery optimization model 318 may generate a delivery route of a delivery vehicle from a delivery station to multiple delivery locations. The delivery route may include one or more locations at which the delivery assistant 310 is to depart from one of the delivery vehicles 302 to deliver one or more packages to one or more delivery locations while the delivery vehicle driver 308 continues to drive the delivery vehicle to separate delivery locations to make additional deliveries separately from the delivery assistant 310. The delivery optimization model 318 may optimize the locations at which the delivery assistant 310 is to depart from the delivery vehicle for separate deliveries, the locations at which the delivery assistant 310 is to rendezvous with the delivery vehicle after making separate deliveries, the driving route of the delivery vehicle (including when separated from the delivery assistant 310), the walking route of the delivery assistant 310 (e.g., from the location at which the delivery assistant 310 departs the delivery vehicle, to one or more delivery locations separate from the delivery vehicle's driving route, and to a rendezvous location), and the packages to be delivered by the delivery driver and by the delivery assistant 310 (e.g., which packages the delivery assistant 310 should take from the delivery vehicle to be delivered separately while the delivery vehicle driver 308 continues deliveries from the delivery vehicle). In this manner, the delivery optimization model 318 may allow the delivery assistant 310 to act as both a helper (e.g., helping the delivery vehicle driver 308 while both are in a delivery vehicle) and as a separate walker (e.g., performing separate deliveries by departing from the delivery vehicle while the delivery vehicle continues to drive to separate delivery locations).

In one or more embodiments, the delivery optimization model 318 may segment a delivery route into portions (e.g., as shown in FIG. 2) in which the delivery assistant 310 departs the delivery vehicle (e.g., with a handcart) with packages and delivers the packages as a walker while the delivery vehicle driver 308 separately continues to drive the delivery vehicle to other delivery locations. For example, the delivery optimization model 318 may identify areas that are not as dense and where transit times are longer and parking is easier, as such areas may be more suitable for driving than for walking. The delivery optimization model 318 may allow for the delivery route to have times when the delivery assistant 310 operates as a helper in the delivery vehicle and times when the delivery assistant 310 operates separately as a walker.

In one or more embodiments, the delivery optimization model 318 may optimize the lowest on-zone time by looking at a delivery route and breaking it into segments (e.g., sets of consecutive packages along a trace). A segment may represent a meet-up in which the delivery assistant 310 and the delivery vehicle driver 308 deliver a next set of packages. The delivery optimization model 318 considers for a segment whether to split the packages and how (e.g., between the delivery vehicle driver 308 and the delivery assistant 310), or to deliver packages together (e.g., from the delivery vehicle together). For an example of splitting the packages, for packages 5-20 on a delivery route, the delivery optimization model 318 may assess partition options (e.g., package 5 vs. 6-20, packages 5 and 6 vs. 7-20, packages 5-7 vs. 8-20, . . . , packages 5-19 vs. 20) and assigns the lower-indexed packages to either the delivery vehicle driver or the delivery assistant 310. For a partition and assignment, the cost may be the maximum time for the delivery vehicle driver 308 or delivery assistant 310 to complete their assigned package deliveries. If either delivery vehicle driver 308 or the delivery assistant 310 completes their assignment first, they will have to wait until the other completes their assignment before moving on to their next delivery block. Any option may incur a meet-up penalty to account for time wasted coordinating a rendezvous location. The delivery optimization model 318 may compare any package splitting option against an option in which helper and delivery vehicle driver 308 work together to deliver all the packages in the partition. In this case the service time is reduced and no meetup penalty is added. The delivery optimization model 318 optimizes for the partitions and assignments that result in the least total time on-zone. When the delivery optimization model 318 selects to split the delivery vehicle driver 308 and helper, the optimal partitions are those that minimize the maximal delivery times between the delivery vehicle driver 308 and helper.

In one or more embodiments, given the optimized on-zone time, the delivery optimization model may calculate a time-constrained boost factor for a delivery route. With respect to a vehicle size constraint, the delivery optimization model 318 may calculate a cube-constrained boost factor for a delivery route. The delivery route's boost factor may be the smallest of the two calculations.

In one or more embodiments, the delivery optimization model 318 may divide packages between the delivery vehicle driver 308 and the delivery assistant 310 according to Equation (1) for the cost element. The total cost of delivering all packages 1 through p on a delivery route may be represented by F(p) in Equation (2). The stopping criterion may be represented by F(0)=0.

In one or more embodiments, the following constraints may be enforced on the delivery optimization model 318: (1) The total package size within a helper block may correspond to the cubic feet of a walker cart; (2) the helper walking distance within a helper block may be limited (e.g., one mile or less); (3) the helper working time (e.g., service time plus walking time) within a helper block may be limited (e.g., two hours or less); (4) helper walking speed may be estimated (e.g., three miles per hour) and helpers follow delivery route directions intended for a delivery vehicle; (5) meetup/rendezvous time may consume a certain amount of time (e.g., twenty minutes); and (6) the delivery optimization model 318 may be run on aggregates of packages such that packages may be on a same sort zone, address identifier, place identifier, or stop identifier, to prevent coincidence between the delivery vehicle driver 308 and the delivery assistant 310. For example, the delivery optimization model may identify consecutive package blocks adding up to the total package size allowed by the walker cart or bag. The delivery optimization model 318 may build a table with a first and last package identifier of a candidate block of packages that may fit on the size allowed by the walker cart, and may find all possible non-overlapping block combinations. The packages not covered by the candidate blocks may be assigned for delivery to the delivery vehicle driver. A new on-zone time may be set to a maximum time between the total helper on-zone time and the driver on-zone time, plus the set rendezvous time penalty per helper block (e.g., twenty minutes). For any delivery route, the delivery optimization model 318 may identify the optimal block combination that results in the least on-zone time minutes.

In one or more embodiments, the delivery optimization model 318 may assume that each split delivery vehicle driver 308 and delivery assistant 310 uses a meetup time $c_m$ of six minutes. The delivery optimization model 318 may calculate the values of $\mu_{qp}$ for combinations of q and p. The delivery optimization model 318 may examine possible splits and select the option that yields the shortest time end to end, including meet up time.

The delivery optimization model 318 may trace back which option provides the optimal value, the delivery optimization model may use a 3-tuple notation of $(\alpha, \beta, \gamma)$ where $\alpha$ represents the value, $\beta \in \{0, 1, 2\}$ where 0 represents a split in which the delivery assistant delivers the lower-indexed packages, 1 represents a split in which the delivery vehicle driver delivers the lower-indexed packages, 2 is when the delivery vehicle driver and the delivery assistant deliver packages together, and $\gamma$ represents where a split occurs (e.g., as long as $\beta$ is not 2).

To trace the optimal solution, the delivery optimization model 318 may trace back to F(0), the stopping criterion, and the solution may be that the delivery vehicle driver 308 and the delivery assistant 310 split the packages, which packages to split, where to separate, and where to rendezvous.

FIG. 4 illustrates example user interfaces for a delivery vehicle driver and for a delivery assistant in accordance with one or more embodiments of the present disclosure.

Referring to FIG. 4, a user interface 402 is shown on the devices 312 as a user interface presented to a delivery vehicle driver, and a user interface 404 is shown on the devices 314 as a user interface presented to a delivery assistant. In this manner, the interfaces for the delivery vehicle driver and the delivery assistant may be different, each showing the different delivery locations and portions of the delivery route, including separation and rendezvous locations.

Figure 5:
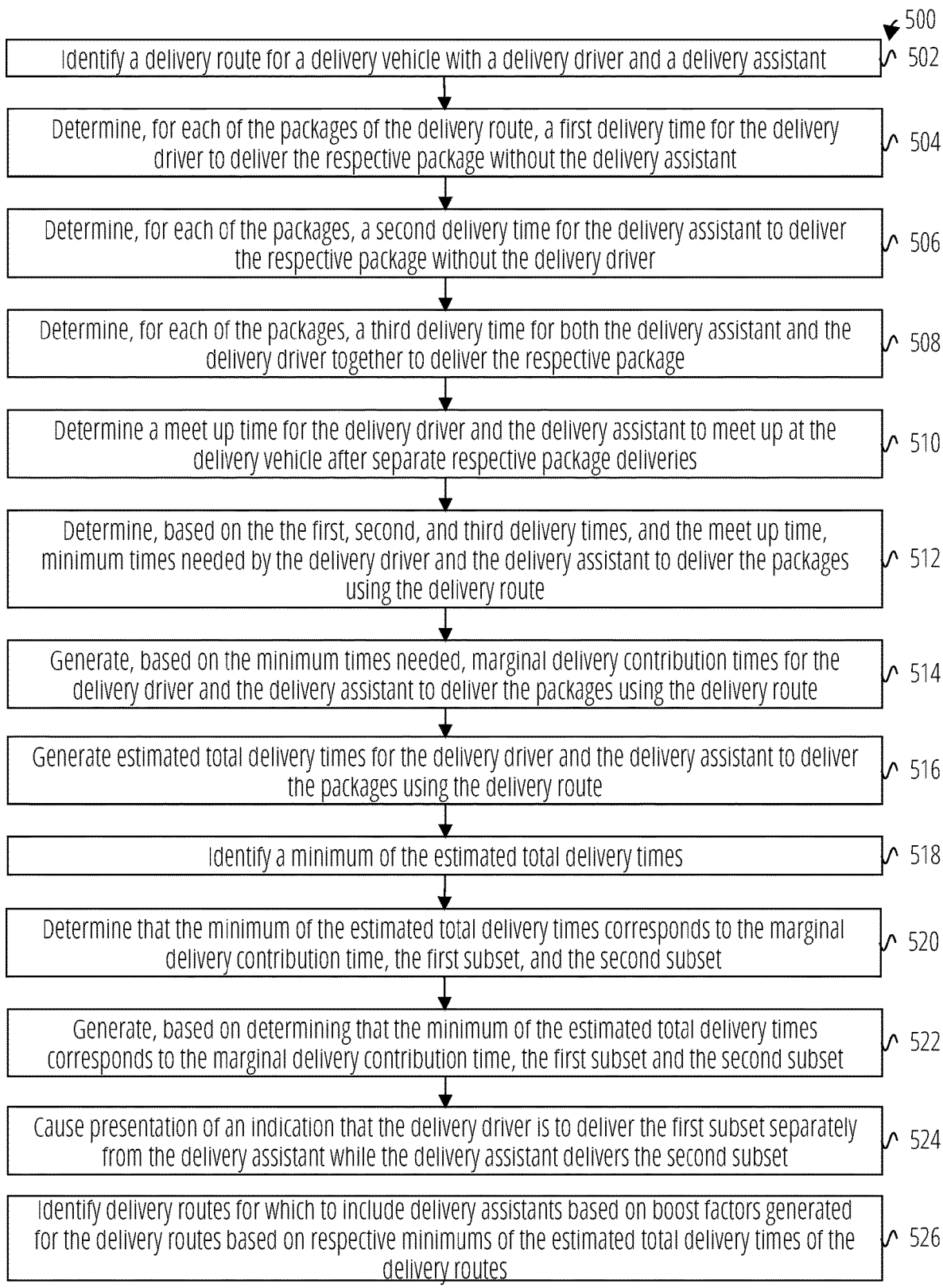
FIG. 5 is a flowchart of an example delivery route optimization process in accordance with one or more embodiments of the present disclosure.

FIG. 5 is a flowchart of an example delivery route optimization process 500 in accordance with one or more embodiments of the present disclosure.

At block 502, a device (or system, e.g., the remote system 316 of FIG. 3, the Delivery helper modules 620 of FIG. 6) may identify a delivery route for a delivery vehicle that includes a delivery vehicle driver and a delivery assistant. The delivery route may have multiple packages to be delivered at multiple delivery locations using only the one delivery vehicle for the delivery route.

At block 504, the device may determine, for each of the packages, a first respective delivery time for the delivery vehicle driver to deliver the respective package without the delivery assistant ($t_p^d$). At block 506, the device may determine, for each of the packages, a second respective delivery time for the delivery assistant to deliver the respective package without the delivery vehicle driver ($t_p^h$). At block 508, the device may determine, for each of the packages, a third delivery time for both the delivery assistant and the delivery driver together to deliver the respective package ($t_p^{dh}$). At block 510, the device may determine a meet up (rendezvous) time for the delivery vehicle driver and the delivery assistant to meet up at the delivery vehicle after separate respective package deliveries (e.g., separation occurring at a separation location). The delivery times and meet up time may be estimated based on historical data indicative of the time to travel certain distances on a delivery route, the time needed to unload and deliver packages based on the number of packages and their size, and estimated driving and walking time. Walking speeds may be assumed. A driving speed may be based on speed limits and/or historical driving speed data for a location. The package data for each delivery may be available to the device, which may determine the amount of time needed to unload a package given its size.

At block 512, the device may determine, based on the first, second, and third delivery times, and based on the meet up time (and number of meet ups on a delivery route), the minimum times needed by the delivery vehicle driver and the delivery assistant to deliver the packages using the delivery route (e.g., Equation (1)). At block 514, the device may generate, based on the minimum times needed, marginal delivery contribution times for the delivery vehicle driver and the delivery assistant (e.g., $\mu_{qp}$ using the minimums of Equation (1)).

At block 516, the device may generate estimated total delivery times for the delivery vehicle driver and the delivery assistant to deliver the packages using the delivery route. The total cost of delivering all packages 1 through p on a delivery route may be represented by F(p) in Equation (2).

At block 518, the device may identify a minimum of the estimated total delivery times. Similarly, the device may examine the various possible splits for r and select the option that yields the shortest time end to end, including meet up time. In the example case above, the optimal solution may be achieved in a split in which the delivery assistant delivers packages 2 and 3, and the delivery vehicle driver delivers packages 4-6 (e.g., concurrently): $\max\{t_{4,6}^d, t_{2,3}^h\} + c_m = \max\{42, 37\} + 6 = 48$.

At block 520, the device may determine that the minimum of the estimated total delivery times corresponds to the marginal delivery contribution time, a first subset of the packages, and a second subset of the packages. The device may trace back which option provides the minimum value, the delivery optimization model may use a 3-tuple notation of $(\alpha, \beta, \gamma)$ where $\alpha$ represents the value, $\beta \in \{0, 1, 2\}$ where 0 represents a split in which the delivery assistant delivers the lower-indexed packages, 1 represents a split in which the delivery vehicle driver delivers the lower-indexed packages, 2 is when the delivery vehicle driver and the delivery assistant deliver packages together, and $\gamma$ represents where a split occurs (e.g., as long as $\beta$ is not 2).

At block 522, the device may generate, based on determining that the minimum of the estimated total delivery times corresponds to the marginal delivery contribution time, the first subset of the packages, and the second subset of the packages, the first and second subsets. The device may trace back to F(0), the stopping criterion, and the solution may be that the delivery vehicle driver and the delivery assistant split the packages 1-3 (e.g., the first subset) and 4-6 (e.g., the second subset), the delivery assistant uses 40 minutes to deliver packages 1-3 and the delivery vehicle driver uses 42 minutes to deliver packages 4-6, the rendezvous uses six minutes, resulting in max{40, 42}+6=48 minutes. The delivery vehicle driver and the delivery assistant may continue making deliveries together (e.g., for package 7) after the rendezvous, in the example above.

At block 524, the device may cause presentation of an indication of whether the packages are to be split into subsets, which subsets are to be delivered by the delivery vehicle driver alone, which subsets are to be delivered by the delivery assistant alone, and which subsets are to be delivered together by the delivery vehicle driver and the delivery assistant (e.g., as shown in FIG. 4). The subsets may be indicated by package identifiers, and any package may have a corresponding delivery location (e.g., address) so that the deliverer is presented with the corresponding delivery location. The presentation data, in addition to indications of the package subsets and delivery locations, may indicate separation locations and rendezvous locations. Using the example above, when the packages are divided into subsets of packages 1-3 and 4-6, the separation location may be a location on the delivery route before the delivery location for package 1, and the rendezvous location may be the delivery location for package 6 or a location between the delivery location for package 6 and the delivery location for package 7. Using the example of FIG. 1, the separation location may occur between a delivery location to which the delivery vehicle driver and the delivery assistant deliver a package together (e.g, the delivery location 120) and between respective locations to which the delivery vehicle driver and the delivery assistant separately deliver packages (e.g., the delivery location 122, the delivery location 126). The presentation data may include map data showing streets, driving and walking directions, indicators of delivery locations, indicators of separation locations, and indicators of rendezvous locations, along with estimated travel times and times expected for deliveries. The device may cause presentation of the presentation data at one or more other devices (e.g., the devices 312 of FIG. 3).

At block 526, the device may identify which delivery routes among multiple different delivery routes are to include a delivery assistant with the respective delivery vehicle driver. The number of delivery routes may exceed the number of available delivery assistants available at a given time, so the delivery routes that use a delivery assistant may be the routes with the highest boost factors. In this manner, blocks 502-524 may be repeated for multiple different delivery routes and used to generate a respective boost factor for any given delivery route. Based on the available number of delivery assistants N, that N delivery routes with the highest boost factors may be selected for assignment of a delivery assistant.

The descriptions herein are not meant to be limiting.

Figure 6:
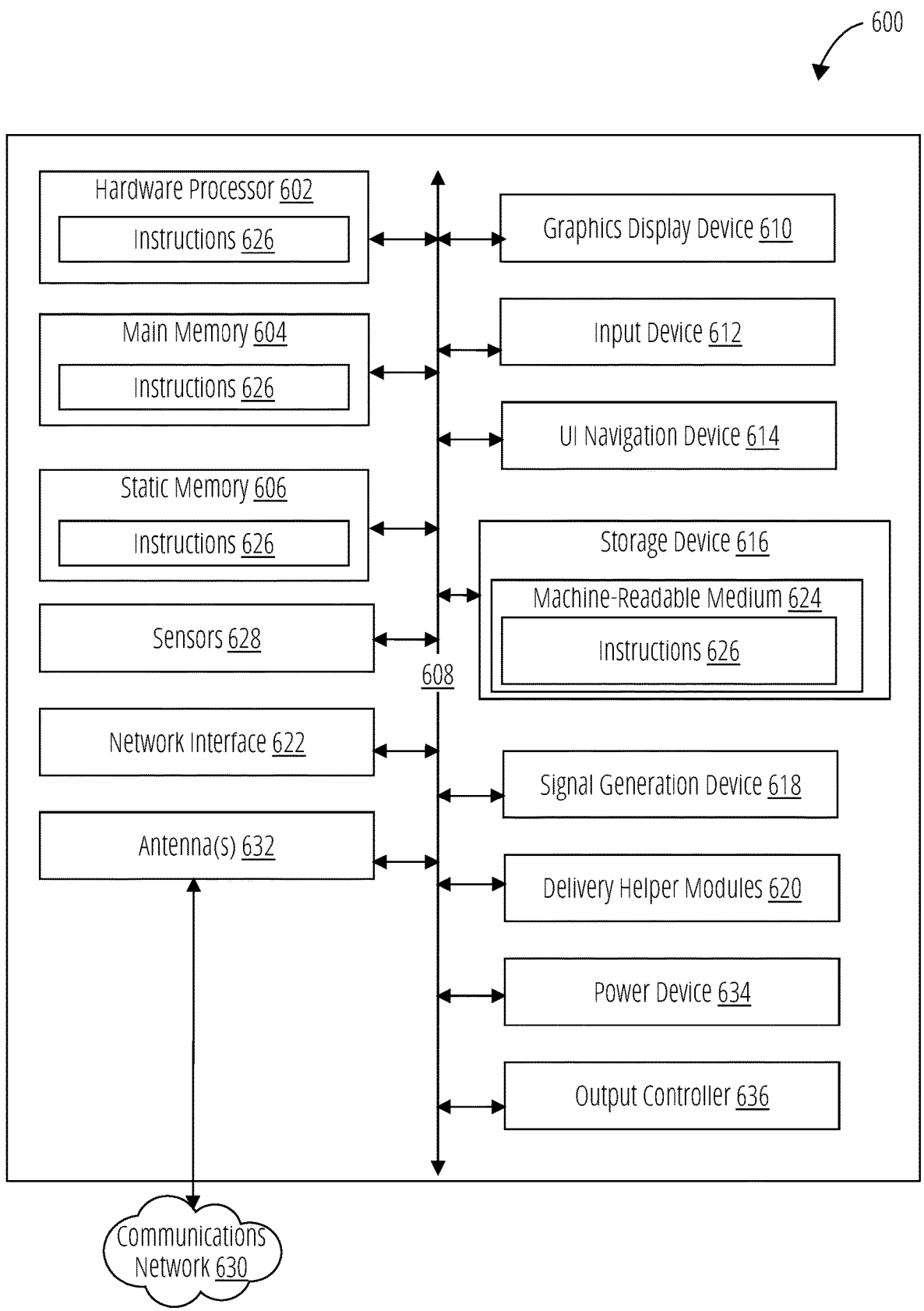
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the delivery vehicle 102 of FIG. 1, the delivery vehicles 302, the remote system 316, and/or the devices 312 of FIG. 3) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine 600 (e.g., computer system) may include a hardware processor 602 (e.g., a central processing unit (CPU), a graphics processing unit (GPU), a hardware processor core, or any combination thereof), a tensor processing unit (TPU), a main memory 604 and a static memory 606, some or all of which may communicate with each other via an interlink (e.g., bus 608). The machine 600 may further include a power device 634, a graphics display device 610, an input device 612 (e.g., a keyboard), and a user interface UI navigation device 614 (e.g., a mouse). In an example, the graphics display device 610, input device 612, and UI navigation device 614 may be a touch screen display. The machine 600 may additionally include a storage device 616, a signal generation device 618, one or more delivery helper modules 620 (e.g., capable of performing steps according to FIGS. 1-5), a network interface 622 coupled to antenna(s) 632, and one or more sensors 628. The machine 600 may include an output controller 636, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine-readable medium 624 on which is stored one or more sets of data structures or instructions 626 (e.g., software) embodying or utilized by any one or more of the techniques or functions described herein. The instructions 626 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 624 is illustrated as a single medium, the term "machine-readable medium" may include a single medium or multiple media (e.g., a centralized or distributed database, and/or associated caches and servers) configured to store the one or more instructions 626.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 626 may further be transmitted or received over a communications network 630 using a transmission medium via the network interface 622 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface 622 may include one or more physical jacks (e.g., Ethernet, coaxial, or phone jacks) or one or more antennas to connect to the communications network 626. In an example, the network interface 622 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method of optimizing a delivery route for a delivery vehicle driver and a delivery assistant, the method comprising:
   identifying, by at least one processor of a first device, a delivery route for a delivery vehicle, the delivery route comprising multiple delivery locations to which packages are to be delivered from the delivery vehicle;
   determining, by the at least one processor, for each of the packages, a first delivery time needed for a delivery vehicle driver of the delivery vehicle to deliver the respective package without the delivery assistant;
   determining, by the at least one processor, for each of the packages, a second delivery time needed for a delivery assistant of the delivery vehicle to deliver the respective package without the delivery vehicle driver;
   determining, by the at least one processor, for each of the packages, a third delivery time needed for both the delivery assistant and the delivery vehicle driver to travel together in the delivery vehicle to deliver the respective package;
   determining, by the at least one processor, a meet up time for the delivery vehicle driver and the delivery assistant to meet up at the delivery vehicle after separate respective package deliveries;
   determining, by the at least one processor, based on the first delivery time, the second delivery time, the third delivery time, and the meet up time, minimum times needed by the delivery vehicle driver and the delivery assistant to deliver the packages using the delivery route, wherein the minimum times needed comprise a split delivery time period during which the delivery vehicle driver delivers a first subset of the packages separately while the delivery assistant delivers a second subset of the packages;
   generating, by the at least one processor, based on the minimum times needed, marginal delivery contribution times for the delivery vehicle driver and the delivery assistant to deliver the packages using the delivery route, the marginal delivery contribution times each comprising 3-tuples for which a first value of the 3-tuples is a respective value of the minimum times needed, a second value of the 3-tuples is indicative of the split delivery time, and a third value of the 3-tuples is indicative of a package of the first subset and the second subset;
   generating, by the at least one processor, estimated total delivery times for the delivery vehicle driver and the delivery assistant to deliver the packages using the delivery route, based on a minimum of respective sums of respective marginal delivery contribution times of the marginal delivery contribution times and respective subsets of the packages, the respective subsets comprising the first subset and the second subset;
   identifying, by the at least one processor, a minimum of the estimated total delivery times;
   determining, by the at least one processor, that the minimum of the estimated total delivery times corresponds to a marginal delivery contribution time of the marginal delivery contribution times;
   generating, by the at least one processor, based on determining that the minimum of the estimated total delivery times corresponds to the marginal delivery contribution time, the first subset and the second subset; and
   causing presentation, by the at least one processor, at a second device, of a first indication that the delivery vehicle driver is to deliver the first subset, using the delivery route, separately from the delivery assistant while the delivery assistant delivers the second subset using the delivery route.

2. The method of claim 1, further comprising:
   determining a first maximum of either delivery time needed by the delivery assistant to deliver the first subset or delivery time needed by the delivery vehicle driver to deliver the second subset;
   determining a second maximum of either delivery time needed by the delivery assistant to deliver the second subset or delivery time needed by the delivery vehicle driver to deliver the first subset; and
   determining a minimum of either the first maximum or the second maximum,
   wherein determining the minimum times needed is further based on determining the minimum of either the first maximum or the second maximum.

3. The method of claim 2, further comprising:
   determining a minimum of either the third delivery time or the minimum of either the first maximum or the second maximum,
   wherein determining the minimum times needed is further based on determining the minimum of either the third delivery time or the minimum of either the first maximum or the second maximum.

4. The method of claim 1, wherein identifying the minimum of the estimated total delivery times is based on a sum of a third subset of the packages and a respective marginal delivery contribution for the packages.

5. A method of optimizing a delivery route for a delivery vehicle driver and a delivery assistant, the method comprising:
   identifying, by at least one processor of a first device, a delivery route for a delivery vehicle, the delivery route comprising multiple delivery locations to which packages are to be delivered from the delivery vehicle;
   determining, by the at least one processor, for each of the packages, a first delivery time needed for a delivery vehicle driver of the delivery vehicle to deliver the respective package without the delivery assistant;
   determining, by the at least one processor, for each of the packages, a second delivery time needed for a delivery assistant of the delivery vehicle to deliver the respective package without the delivery vehicle driver;
   determining, by the at least one processor, for each of the packages, a third delivery time needed for both the delivery assistant and the delivery vehicle driver to travel together in the delivery vehicle to deliver the respective package;
   determining, by the at least one processor, a meet up time for the delivery vehicle driver and the delivery assistant to meet up at the delivery vehicle after separate respective package deliveries;
   determining, by the at least one processor, based on the first delivery time, the second delivery time, the third delivery time, and the meet up time, minimum times needed by the delivery vehicle driver and the delivery assistant to deliver the packages using the delivery route, wherein the minimum times needed comprise a split delivery time period during which the delivery vehicle driver delivers a first subset of the packages separately while the delivery assistant delivers a second subset of the packages;
   generating, by the at least one processor, estimated total delivery times for the delivery vehicle driver and the delivery assistant to deliver the packages using the delivery route, based on the minimum times needed and respective subsets of the packages, the respective subsets comprising the first subset and the second subset;
   determining, by the at least one processor, that a minimum of the estimated total delivery times corresponds to the first subset and the second subset; and
   causing presentation, by the at least one processor, at a second device, of a first indication that the delivery vehicle driver is to deliver the first subset, using the delivery route, separately from the delivery assistant while the delivery assistant delivers the second subset using the delivery route.

6. The method of claim 5, further comprising:
   generating, based on the minimum times needed, marginal delivery contribution times for the delivery vehicle driver and the delivery assistant to deliver the packages using the delivery route,
   wherein generating the estimated total delivery times are further based on the marginal delivery contribution times.

7. The method of claim 6, wherein the marginal delivery contribution times each comprising 3-tuples for which a first value of the 3-tuples is a respective value of the minimum times needed, a second value of the 3-tuples is indicative of the split delivery time, and a third value of the 3-tuples is indicative of a package of the first subset and the second subset.

8. The method of claim 5, further comprising:
   determining a first maximum of either delivery time needed by the delivery assistant to deliver the first subset or delivery time needed by the delivery vehicle driver to deliver the second subset; and
   determining a second maximum of either delivery time needed by the delivery assistant to deliver the second subset or delivery time needed by the delivery vehicle driver to deliver the first subset.

9. The method of claim 8, further comprising:
   determining a minimum of either the first maximum or the second maximum,
   wherein determining the minimum times needed is further based on determining the minimum of either the first maximum or the second maximum.

10. The further of claim 9, further comprising:
    determining a minimum of either the third delivery time or the minimum of either the first maximum or the second maximum.

11. The further of claim 10, wherein determining the minimum times needed is further based on determining the minimum of either the third delivery time or the minimum of either the first maximum or the second maximum.

12. The further of claim 5, wherein identifying the minimum of the estimated total delivery times is based on a sum of a third subset of the packages and a respective marginal delivery contribution for the packages.

13. The further of claim 5, further comprising:
    causing presentation of an indication of a separation location at which the delivery assistant is to depart from the delivery vehicle to deliver the first subset separately from the delivery vehicle driver delivering the second subset; and
    causing presentation of an indication of a rendezvous location at which the delivery assistant is to meet up with the delivery vehicle driver and the delivery vehicle after delivering the first subset, the meet up time associated with the rendezvous location.

14. The further of claim 13, wherein the delivery route comprises multiple separation locations and multiple rendezvous locations.

15. The further of claim 5, further comprising:
    determining a number of the packages whose volume is less than or equal to a volume of a cart with which the delivery assistant is to deliver packages separately from the delivery vehicle and the delivery vehicle driver,
    wherein the first subset is based on the number of packages.

16. A system for optimizing a delivery route for a delivery vehicle driver and a delivery assistant, the system comprising:
    memory for storing instructions that, when executed by at least one processor coupled to the memory, cause the at least one processor to:
    identify a delivery route for a delivery vehicle, the delivery route comprising multiple delivery locations to which packages are to be delivered from the delivery vehicle;
    determine, for each of the packages, whether the package is in a first subset of the packages to be delivered by a delivery vehicle driver or a second subset of the packages to be delivered by a delivery assistant; and
    cause presentation, at a second device, of a first indication that the delivery vehicle driver is to deliver the first subset, using the delivery route, separately from the delivery assistant, while the delivery assistant delivers the second subset using the delivery route.

17. The system of claim 16, wherein execution of the instructions further causes the at least one processor to:
generate marginal delivery contribution times for the delivery vehicle driver and the delivery assistant to deliver the packages using the delivery route; and
generate estimated total delivery times based on the marginal delivery contribution times,
wherein to determine whether the package is in the first subset or the second subset is based on the estimated total delivery times.

18. The system of claim 17, wherein the marginal delivery contribution times each comprise 3-tuples for which a first value of the 3-tuples is a respective value of minimum times needed for delivery, a second value of the 3-tuples is indicative of a split delivery time, and a third value of the 3-tuples is indicative of a package of the first subset and the second subset.

19. The system of claim 17, wherein execution of the instructions further causes the at least one processor to:
determine a first maximum of either delivery time needed by the delivery assistant to deliver the first subset or delivery time needed by the delivery vehicle driver to deliver the second subset; and
determine a second maximum of either delivery time needed by the delivery assistant to deliver the second subset or delivery time needed by the delivery vehicle driver to deliver the first subset.

20. The system of claim 17, wherein execution of the instructions further causes the at least one processor to:
identify delivery routes, comprising the delivery route, to which to assign delivery assistants, comprising the delivery assistant, based on the marginal delivery contribution times.

\* \* \* \* \*